United States Patent [19]
Brockhoff et al.

[11] Patent Number: 5,681,462
[45] Date of Patent: Oct. 28, 1997

[54] DEVICE FOR SEPARATING LIQUIDS OF DIFFERING DENSITY

[75] Inventors: Ulrich Brockhoff, Belm; Eberhard Kolitz, Bietigheim; Michael Wolf, Gaeufelden, all of Germany

[73] Assignee: Filterwerk Mann & Hummel GmbH, Ludwigsburg, Germany

[21] Appl. No.: 520,569

[22] Filed: Aug. 29, 1995

[30] Foreign Application Priority Data

Sep. 3, 1994 [DE] Germany .................. 44 31 496.5

[51] Int. Cl.$^6$ ................................................. C02F 1/40
[52] U.S. Cl. .................... 210/253; 210/259; 210/540; 210/DIG. 5
[58] Field of Search ...................... 210/235, 253, 210/256, 257.1, 258, 259, 538, 539, 540, DIG. 5

[56] References Cited

U.S. PATENT DOCUMENTS

| | | | |
|---|---|---|---|
| 2,609,932 | 9/1952 | Fricke | 210/DIG. 5 |
| 3,040,894 | 6/1962 | Pall | 210/235 |
| 3,272,337 | 9/1966 | Elwell | 210/235 |
| 3,865,732 | 2/1975 | Terhune et al. | 210/DIG. 5 |
| 4,299,699 | 11/1981 | Boogay | 210/DIG. 5 |
| 4,335,001 | 6/1982 | Yves et al. | 210/DIG. 5 |
| 4,361,488 | 11/1982 | White et al. | 210/538 |
| 4,650,581 | 3/1987 | Angles et al. | 210/DIG. 5 |
| 5,017,294 | 5/1991 | Durrieu | 210/DIG. 5 |
| 5,039,425 | 8/1991 | Caris | 210/DIG. 5 |
| 5,350,529 | 9/1994 | Kitko | 210/259 |
| 5,417,848 | 5/1995 | Erdmannsdörfer et al. | 210/DIG. 5 |

FOREIGN PATENT DOCUMENTS

| | | |
|---|---|---|
| 264877 | 4/1988 | European Pat. Off. . |
| 585689 | 3/1994 | European Pat. Off. . |
| 2375890 | 7/1978 | France . |
| 1123068 | 2/1962 | Germany . |
| 7721542 U | 12/1977 | Germany . |
| 1557965 | 12/1979 | United Kingdom . |

*Primary Examiner*—Christopher Upton
*Attorney, Agent, or Firm*—Evenson, McKeown, Edwards & Lenahan P.L.L.C.

[57] ABSTRACT

A device for separating liquids of differing density including a container 10 for the liquid, the container having at least two outlet openings 12, 14. In addition, at least one coalescer element 16 is provided to which the liquid to be separated can be fed. The container 10 and/or the coalescer element 16 and/or additional elements 18, 20 have a modular construction and may be assembled together in any desired sequence.

14 Claims, 6 Drawing Sheets

DEVICE FOR SEPARATING LIQUIDS OF DIFFERING DENSITY

BACKGROUND OF THE INVENTION

This invention relates to an apparatus for separating liquids of differing density.

Angles et al., U.S. Pat. No. 4,650,581 discloses a device for separating emulsions or liquids of differing density. This device consists of a coalescer which is arranged on a container. The container is provided with an upper and a lower outlet tube. The de-mixed liquids can be withdrawn through these outlet tubes. It is a disadvantage of this device that the container and the coalescer form a unit which has a very unfavorable exterior structure. Another disadvantage is the fact that it is not possible to adapt this device to different demands with respect to the rate of flow and with respect to the mixing conditions of the liquids to be separated. This known system requires a very large amount of space. Individual elements cannot be exchanged or can be exchanged only at disproportionately high cost.

Another process and device for separating emulsions are disclosed in Yves et al., U.S. Pat. No. 4,335,001. In this process, a container is used into which the coalescer is integrated. This device also has the disadvantage that the container and the coalescer form a structural unit, and it is not possible to adapt the construction to different operating conditions. In addition, it is only possible to exchange the coalescer when the entire container is emptied. This means that the separating operation must be interrupted.

SUMMARY OF THE INVENTION

It is therefore an object of the invention to provide a device for separating liquids of differing density which is suitable for a multitude of applications and can be adapted in a simple manner to the most varied operating conditions.

These and other objects of the invention are achieved by providing an apparatus for separating liquids of differing density, comprising a liquid container having at least two outlet openings opening at different levels, and at least one coalescer element through which liquid to be separated is passed; wherein the container and the coalescer element(s) have a modular construction.

It is possible to separate liquids of differing density if one of the liquids is present in the disperse phase; i.e. if it is emulsified. The disperse phase may be either lighter or heavier than the continuous phase.

It is an advantage of the invention that the device is variable in its application. Thus, it is possible, for example, to separate heating oil or diesel and water. In addition, this device may replace conventional light-liquid separating vessels. In this case, the advantage is a much smaller overall size and a rapid separation.

Basically, all mixed liquids which are not in the dissolved state can be separated by means of this device.

Another advantage of the invention is the fact that, because of its modular construction, the device can be adapted to different operating conditions. It is also possible to combine this device with additional elements.

In accordance with one embodiment of the invention, the device may be provided, for example, with a plurality of coalescer elements. Desirably, the coalescer elements are connected with the container via a change-over device, so that it is possible to exchange one of the coalescer elements during the separating operation.

In accordance with another embodiment of the invention, the coalescer element is arranged above the container. This facilitates easy access to the coalescer element, so that it can be exchanged very rapidly.

According to an alternative embodiment of the invention, the coalescer element it arranged at the bottom of the container. Although, as a result, the coalescer element is integrated in the container, it can be detached from the container by means of suitable coupling elements, such as a bayonet catch or a similar device, and can be removed from the container.

Of course, it is also possible to arrange one or more coalescer elements of a first type, which need to be exchanged from time to time, outside the container, and to arrange one or more coalescer elements of a second type, which rarely or never need to be exchanged, inside the container.

In special cases, it is necessary to separate more than two liquids Of differing densities. For this purpose, a third outlet may be provided on the container. This third outlet is arranged in the area in which the liquid of intermediate density is collected. Advantageously, this outlet is provided with a valve which is opened only when it is required; i.e., when a third liquid of intermediate density must be removed from the container.

A further embodiment of the invention envisions a preliminary filter connected in front of the coalescer, so that the liquid to be separated is first mechanically cleaned. This preliminary filter also has a modular construction; i.e. this preliminary filter comprises a module or element which can be coupled to or disconnected from the device depending on its intended use.

In a further embodiment of the invention, in which the coalescer element is arranged as an exchangeable element on the container or on a connecting element, the coalescer element may be provided with an operating element which closes the container inlet opening as soon as the exchangeable element is removed. If a plurality of coalescer elements are provided as exchangeable elements on the device, then the liquid separating operation also can be maintained during the exchange of the exchangeable element.

Another advantageous embodiment of the device can be achieved by means of a preliminary air separator. Particularly when the liquid separation is used in conjunction with an oil-flooded screw-type compressor, small amounts of air may arrive in the device together with the liquid to be separated. If this air is removed by means of a preliminary air separator, the efficiency of the liquid separation can be increased.

If the liquid mixture to be separated is supplied to the separating device in an unpressurized manner, it is advantageous also to provide a liquid pump which generates a liquid pressure required for the separation.

Naturally, there is a multitude of other combination possibilities. Thus, the device may be combined, for example, with a condensate separator or a steam trap. Likewise, it is also possible to combine the separator with fine filters or activated carbon filters, which are connected downstream from the separator. Because of the compact construction of the device, it may also be used as a free-standing apparatus, e.g. in a mobile application. Depending on the application, the coalescence separator itself may also be equipped with different coalescer elements. Thus, it is possible, for example, to use paper formed from glass fibers, sintered compacts of polyethylene, glass wool, synthetic fibers, etc.

In order to conduct the liquid having the lower density within the container, it has been found advantageous to provide a rising cylinder or a rising tube. Such a rising cylinder is constructed, for example, with a sieve and is used for calming down the rising lighter liquid. This rising cylinder is detachably connected to the container.

It is also possible to couple a flow limiting device to the device. As a result, the quality of the separation will be maintained particularly even in case of rates of flow which fluctuate widely.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to representative preferred embodiments illustrated in the accompanying drawings in which.

DETAILED DESCRIPTION OF PREFERRED EMBODIMENTS

Figure 1:
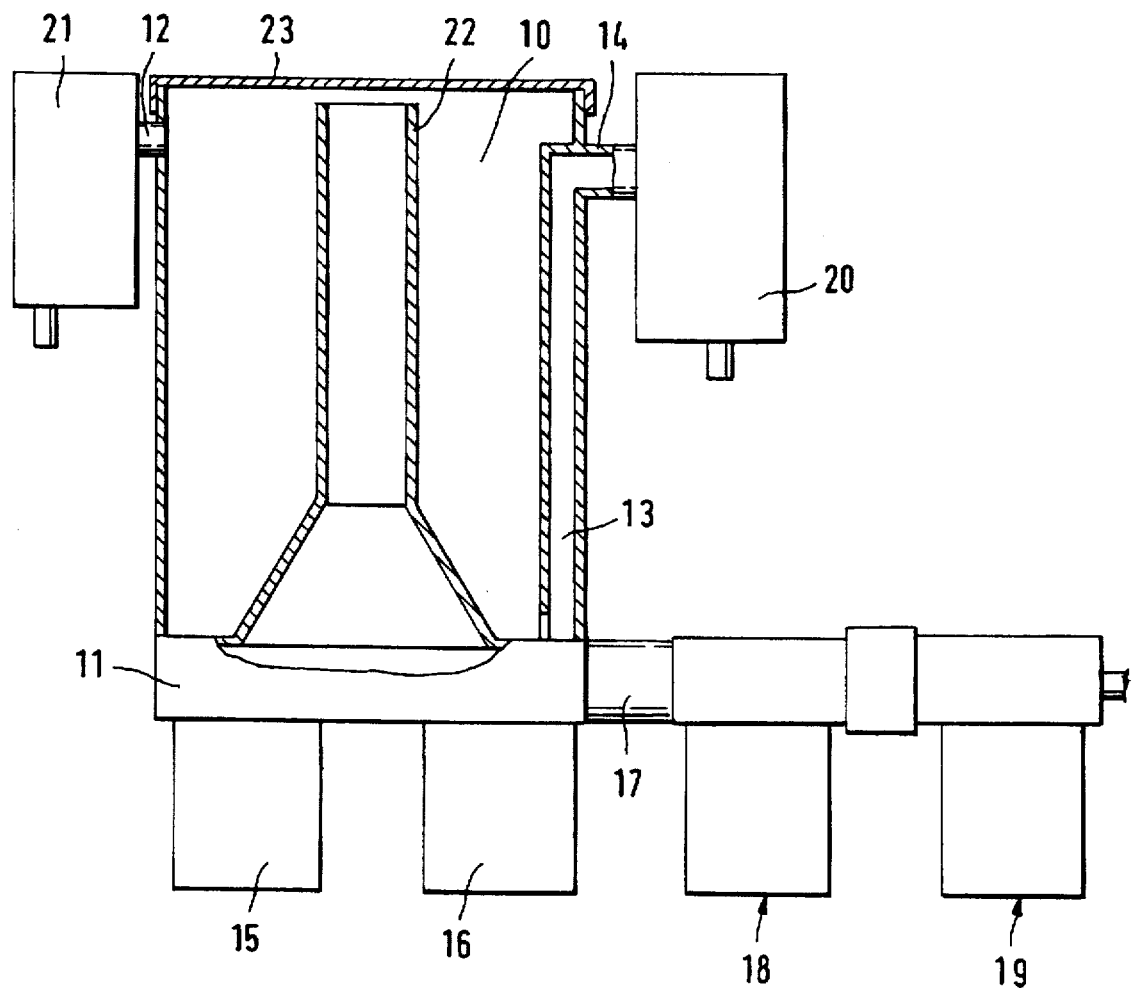
FIG. 1 is a schematic view of a device for separating liquids of differing density which has a modular construction.

The device according to FIG. 1 comprises a container 10 for liquids. On the bottom of this container, an adapter plate 11 is arranged. The apparatus further comprises an outlet 12 at the side for the liquid of lower density and an outlet duct 13 with an outlet 14 for the liquid of higher density. Two coalescer elements 15 and 16 are arranged on the adapter plate 11. An inlet 17 for the liquid mixture to be separated leads into the adapter plate. From the adaptor plate, the liquid passes into one of the two coalescer elements or into both coalescer elements.

In the illustrated embodiment, the liquid to be cleaned first passes through two additional elements of a modular construction before entering inlet 17. These two additional elements comprise a preliminary filter 18 and an air separating element 19. Naturally, instead of this filter and air separator, it is possible to couple other or additional elements, such as a pump, a coarse coalescer or similar devices, to the inlet 17. Two other modules are also connected to outlet 14 and outlet 12. These are extra-fine filters, or optionally activated carbon filters, 20 and 21 which are connected downstream of the outlets. The liquid emerging from the two coalescer elements 15 and 16 will rise inside the sieve-type rising cylinder 22 or will flow through this rising cylinder to the outside. The liquid container 10 is normally closed off by an end plate 23, but may be opened for servicing operations.

Figure 2:
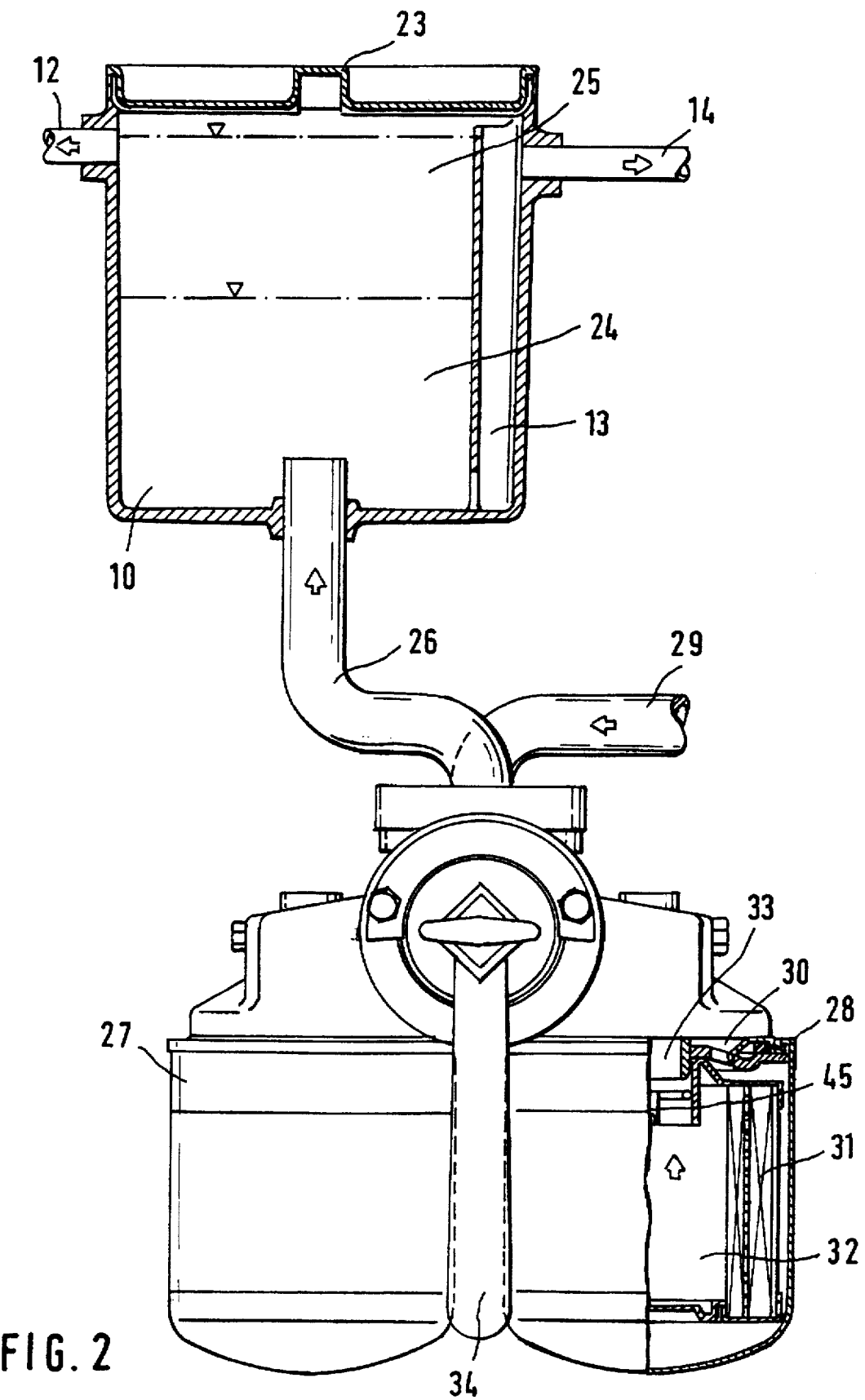
FIGS. 2 through 6 are views of variant embodiments of a separator for separating liquids of differing density.

FIG. 2 illustrates a variant embodiment of a device for separating liquids of differing density. Corresponding parts are identified by the same reference numerals. As illustrated, the liquid container 10 is provided with a first outlet 12, an outlet duct 13 and a second outlet 14. The lower area of container 10 is filled with a liquid 24 of a higher density, and the upper area of container 10 is filled with a liquid 25 of lower density. Container 10 is also provided with an end plate 23. A feed pipe 26 is situated at the bottom of the container 10. A first coalescer element 27 and a second coalescer element 28 are connected via a crossover valve 34 to this feed pipe 26. Both of these coalescer elements are similar in construction to exchangeable filters. By way of a pipe 29, the liquid to be separated is conveyed through a conduit 29 to one of the two coalescer elements, for example, coalescer element 28; flows from there via a space 30 into the outer region of the coalescer element; and then flows through the coalescer which in this case comprises a fiberglass winding 31. In the coalescer, the droplets of one of the two liquids coalesce to form larger drops. Both liquids will then pass through the interior area 32 and the outlet opening 33 to the feeding pipe 26. If one of these two coalescer elements 27 or 28 needs to be exchanged, it first is disconnected from the liquid passage by means of the crossover valve 34; as a result of which the liquid then will flow through the other coalescer element 27.

Figure 3:
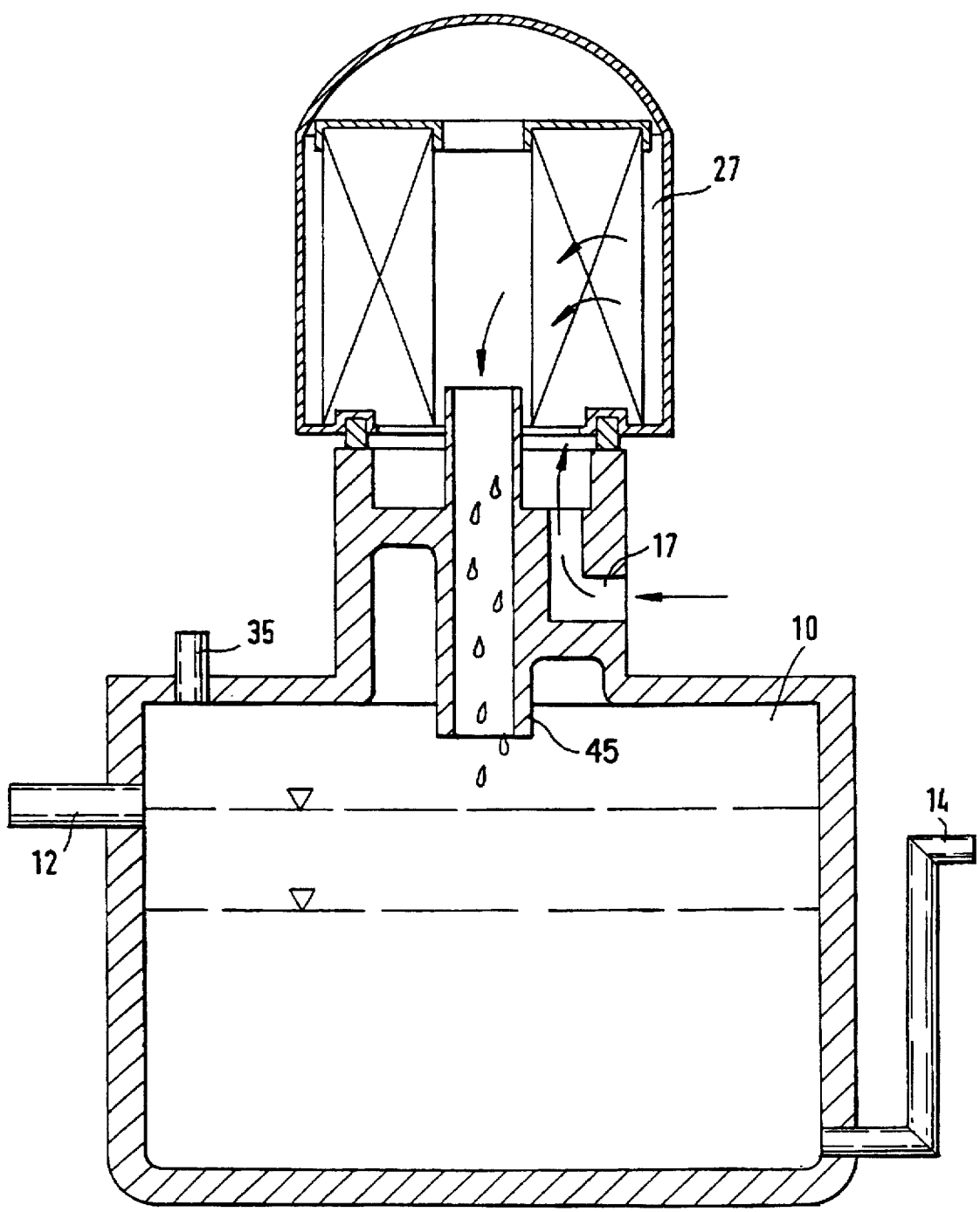

FIG. 3 illustrates a variant in which the coalescer element is arranged above the container. This coalescer element 27 is also constructed as an exchangeable element and may be connected to the liquid container 10 by a bayonet catch or a threaded nipple. It is an advantage that this coalescer element 27 is arranged above the container 10, so that an exchange can be carried out in a simple manner because after a short interruption of the liquid supply, liquid situated in the coalescer 27 flows through the outlet duct 45 into the liquid container 10, so that the coalescer element 27 can be removed while it is almost free of liquid. The container 10 is also equipped with an outlet 12 for the liquid of lower density and an outlet 14 for the liquid of higher density. The container 10 also comprises a vent duct 35. This variant according to FIG. 3 permits particularly favorable separating characteristics if the disperse phase is lighter than the continuous phase because the coalesced disperse phase wets the outlet area.

Figure 4:
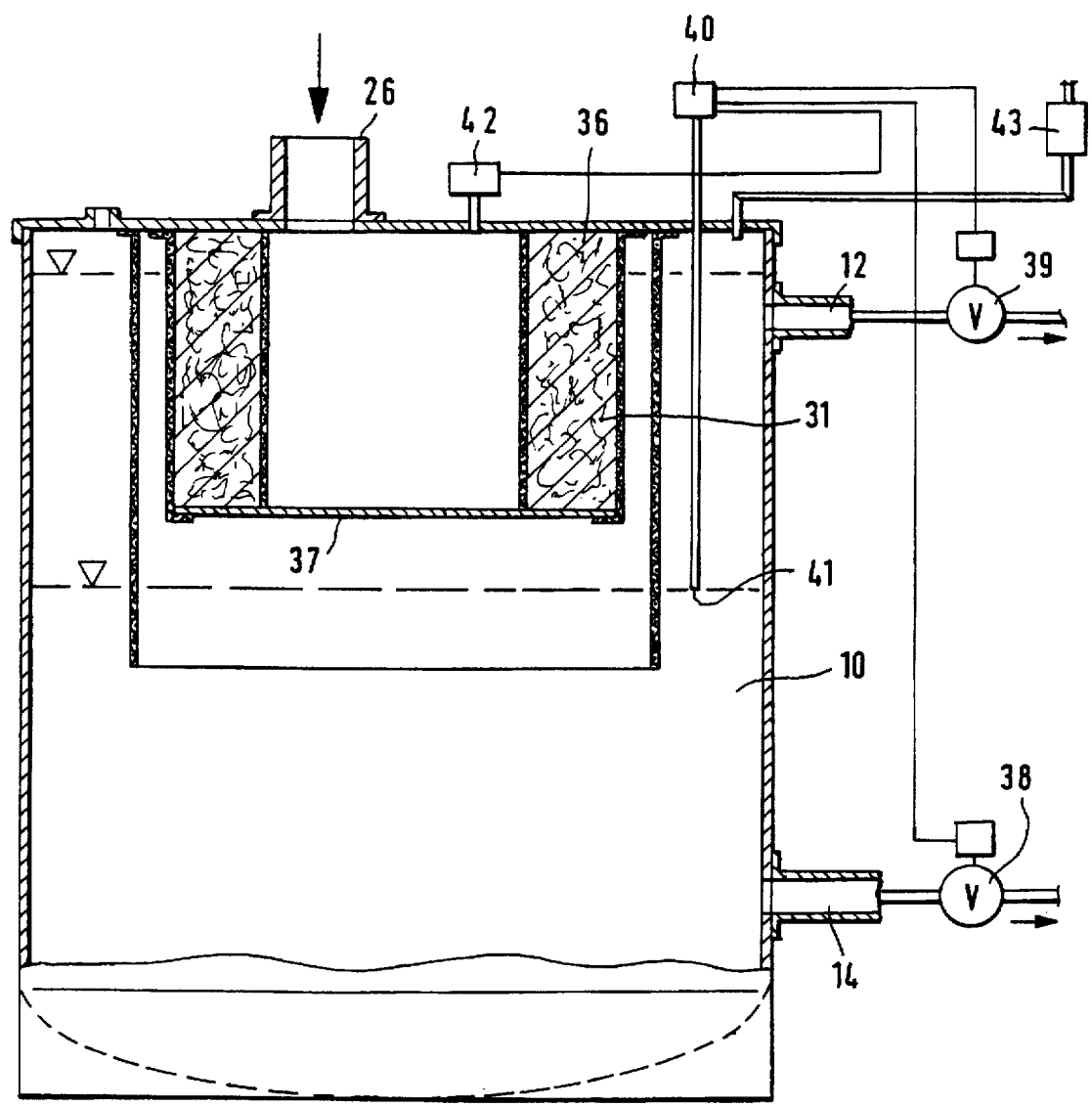

FIG. 4 shows a variant in which the coalescer element 36 is arranged inside the container 10. The liquid is conducted through the feed conduit 26 into the coalescer element 36. Coalescer element 36 is provided with a bottom 37 so that the liquids to be separated must flow into the container 10 through the fiberglass winding 31. This container 10 is also provided with a first outlet opening 12 and a second outlet opening 14. Each outlet is provided with a valve 38, 39. The two valves are activated by an interfacial sensor 40. As soon as the liquid of higher density rises above the sensor element 41 of the interfacial sensor, the interfacial sensor 40 will activate the valve 38, so that the liquid of higher density can be discharged. When the liquid of lower density reaches a maximal height, the interfacial sensor will open up the valve 39, so that the lower density liquid can be discharged through the outlet 12.

Container 10 is furthermore provided with a pressure sensor 42 and an automatic ventilating valve 43. Should the pressure within the container 10 exceed a defined limit value, either the outlet valve 39 or the ventilating valve 43 will be activated to relieve the pressure.

Figure 5:
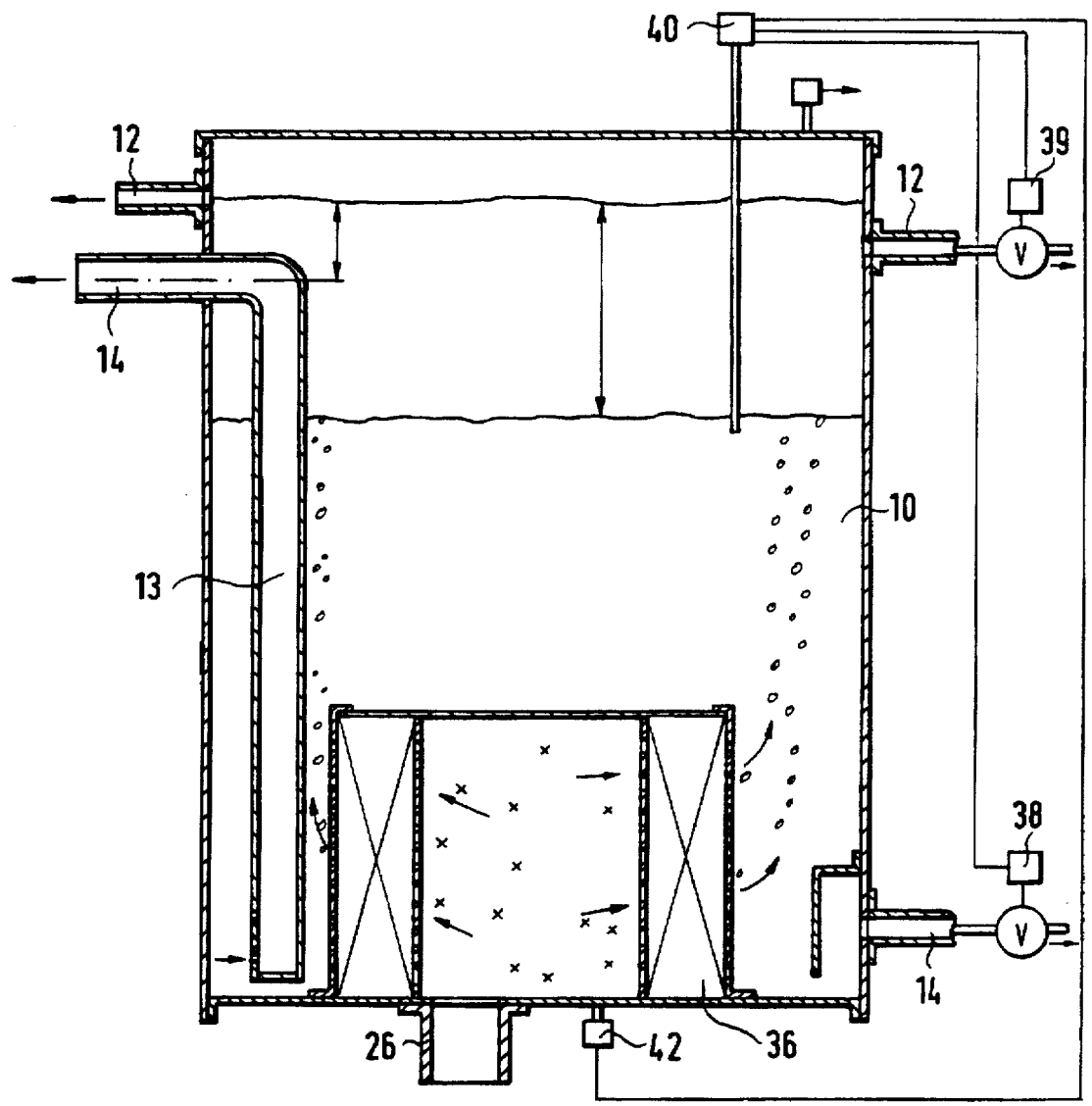

FIG. 5 shows a liquid container 10 in which the coalescer element 36 is arranged at the bottom. The liquid to be separated is introduced through the feed pipe 26, passes through the coalescer element 36, and flows radially outwardly into the interior of container 10. In this case also, the outlet 14 and the outlet 12 are each provided with a valve 38, 39. There is also a pressure sensor 42 and an interfacial sensor 40. The control characteristic for the liquid separation corresponds to that described with respect to FIG. 4.

At the left side of FIG. 5, a simplified alternate embodiment for removal of the liquid is shown. Similar to FIG. 2, an outlet conduit 13 is provided in this case through which the liquid of higher density rises and can be discharged through the outlet 14. The liquid of lower density is discharged through outlet 12.

Figure 6:
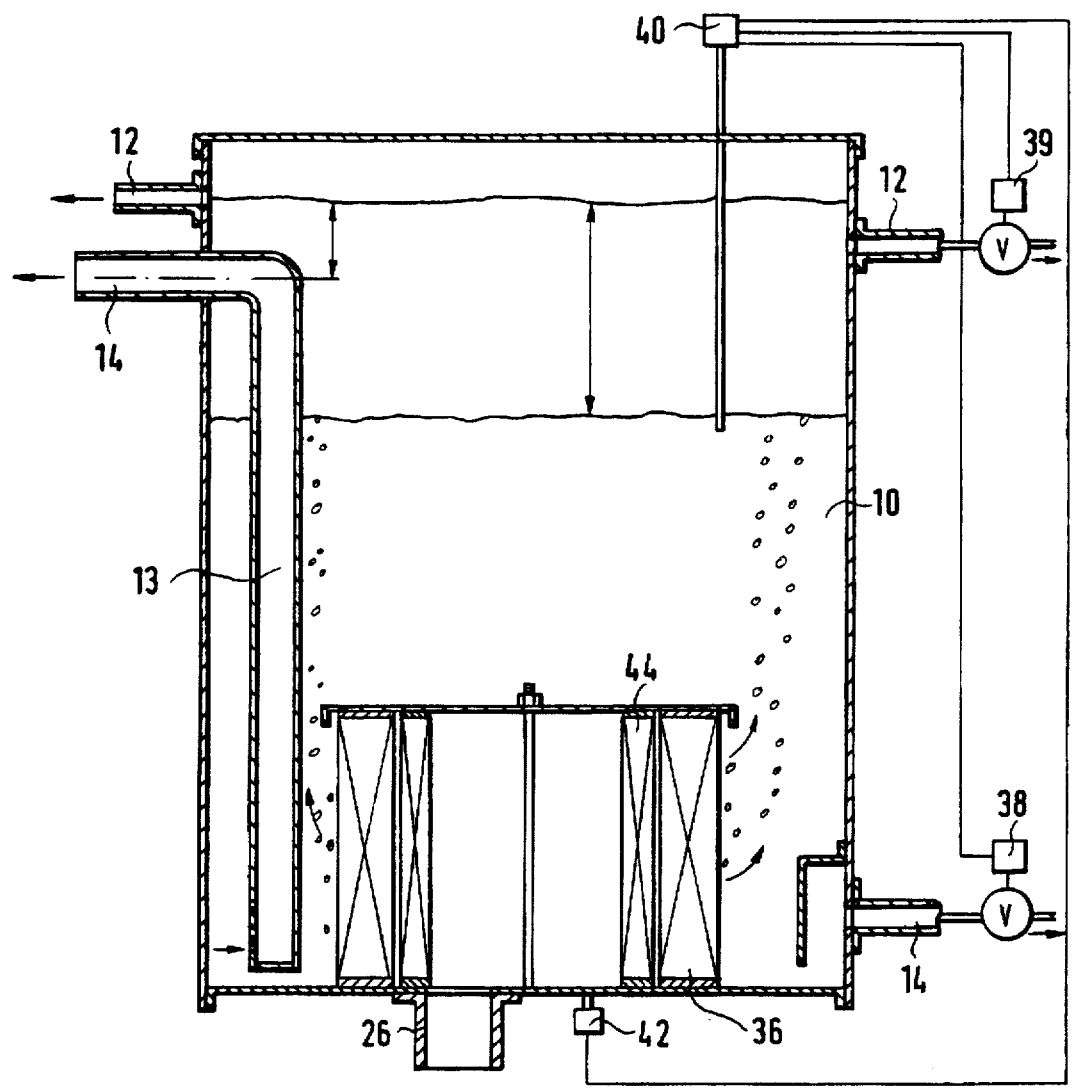

FIG. 6 illustrates a variant which corresponds substantially to that shown in FIG. 5. However, in this case a preliminary filter 44 is provided in addition to the coalescer element 36. This preliminary filter 44 serves to intercept dirt particles or similar substances, so that the coalescer element 36 does not come in contact with such materials which decrease the coalescence effect. Of course, it is also possible to arrange this preliminary filter 44 outside the liquid container 10. This is primarily useful when the preliminary filter has to be exchanged frequently.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for separating liquids of differing density, said apparatus comprising a liquid container having at least two outlet openings opening at different levels, at least two coalescer elements communicating with said liquid container via a passageway through which liquid to be separated is passed, a supply line for liquid to be separated leading to said coalescer elements, and a change-over device for selectively shutting off one of the coalescer elements from said supply line and from said passageway to said liquid container;

wherein the container and the coalescer elements are connected as separate modules, wherein said coalescer elements are exchangeable elements, and wherein the change-over device shuts off one exchangeable element from the liquid container when that one exchangeable element is exchanged while maintaining liquid flow through other of the exchangeable elements to the liquid container.

2. An apparatus according to claim 1, wherein at least one of the coalescer elements is arranged above the liquid container; an inlet for liquid to be separated is provided between the coalescer element arranged above the liquid container and the liquid container, the liquid to be separated flowing radially inwardly through the at least one coalescer element, and the liquid then flowing from within the at least one coalescer element through a transfer conduit into the liquid container.

3. An apparatus according to claim 1, wherein said liquid container has a bottom, at least one of the coalescer elements being arranged adjacent said container bottom, and wherein each of said two outlet openings is provided with a respective shut-off valve.

4. An apparatus according to claim 3, further comprising a third outlet opening arranged intermediate said first and second outlet openings; said third outlet opening being provided with a shut-off valve.

5. An apparatus according to claim 1, further comprising a preliminary filter for liquid to be separated, said preliminary filter being arranged upstream of the coalescer elements.

6. An apparatus according to claim 5, wherein said preliminary filter is arranged outside the liquid container.

7. An apparatus according to claim 1, wherein said exchangeable element is detachably fastened to the liquid container.

8. An apparatus according to claim 1, wherein said coalescer elements each comprise a substantially cylindrical annular body through which liquid to be separated flows in a radially outward direction.

9. An apparatus according to claim 1, further comprising a preliminary air separator upstream of said coalescer elements.

10. An apparatus according to claim 1, further comprising a liquid pump arranged upstream of said coalescer elements.

11. An apparatus according to claim 1, further comprising a fine filter or an activated carbon filter connected to at least one of said outlets so that separated liquid is subsequently fed therethrough.

12. An apparatus for separating liquids of differing density, said apparatus comprising:

a liquid container having at least two outlet openings opening at different levels;

at least two exchangeable coalescer elements through which liquid to be separated is passed, said at least two exchangeable coalescer elements being arranged outside of said container;

a supply pipe for liquid to be separated leading to said coalescer elements;

a feeding pipe leading from said coalescer elements to said liquid container; and a change-over device configured to selectively shut off one of the exchangeable coalescer elements from said supply pipe and said feeding pipe and to divert the passage of liquid to be separated through an other of the exchangeable coalescer elements;

whereby said one coalescer element can be exchanged while maintaining passage of liquid to be separated from the supply pipe through the other coalescer element and the feeding pipe to the liquid container.

13. An apparatus according to claim 12, wherein the container and the coalescer elements are connected as separate modules.

14. An apparatus according to claim 12, further comprising a preliminary filter for liquid to be separated, said preliminary filter being arranged upstream of the coalescer elements.

* * * * *